May 14, 1946. H. RUDOLPH 2,400,440
PRECISION MEASURING INSTRUMENT
Filed Aug. 7, 1944
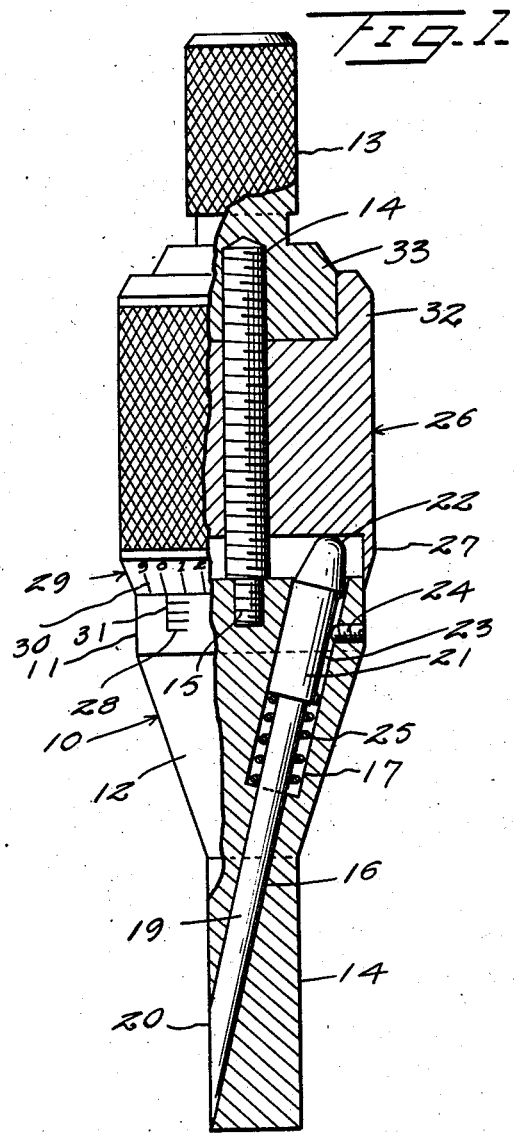
Inventor
Hans Rudolph
By Kimmel & Crowell
Attorneys Patented May 14, 1946

2,400,440

UNITED STATES PATENT OFFICE 2,400,440

PRECISION MEASURING INSTRUMENT

Hans Rudolph, Kansas City, Mo.

Application August 7, 1944, Serial No. 548,386

4 Claims. (Cl. 33—178)

This invention relates to precision measuring instruments.

An object of this invention is to provide an instrument for measuring interior diameters.

Another object of this invention is to provide an instrument embodying a rigid shank or pilot which supports a movable finger or gauge member, with the latter extendible from a side of the shank or pilot by rotation of a calibrated operator.

With the foregoing objects and others which may hereinafter appear, the invention consists of the novel construction, combination and arrangement of parts as will be more specifically referred to and illustrated in the accompanying drawing wherein are shown embodiments of the invention, but it is to be understood that variations, modifications and changes may be resorted to which fall within the scope of the invention as claimed.

In the drawing:

Figure 1 is a detail side elevation partly in longitudinal section of an internal precision measuring instrument constructed according to an embodiment of this invention.

Referring to the drawing, the numeral 10 designates generally an elongated body which is formed with an upper cylindrical part 11, an intermediate frusto-conical part 12 and a lower cylindrical part 14 which extends from the lower apex of the frusto-conical part 12. A handle 13 is disposed above the body 10 and is secured to the upper part 11 by means of a bolt 14 having a reduced threaded lower end 15 which is threaded into the center of the upper part 11.

The body 10 is provided with an opening 16 which is disposed on an angle to the longitudinal axis of the body 10 and opens through the lower portion of the lower member 14. The opening 16 extends upwardly into the intermediate part 12 and communicates with an enlarged opening 17. The enlarged opening 17 extends upwardly through the upper portion of the intermediate part 12 and extends through the upper part 11. A gauge pin 19 is slidable in the opening 16 being formed at its lower end with rounded face 20 which is disposed in the same plane as the longitudinal outer surface of the lower part 14.

The gauge pin 19 is provided at its upper end with an enlarged body 21 which is slidable in the enlarged opening 17 and the upper end of the enlarged body 21 terminates in a rounded head 22. The enlarged body 21 is formed with a longitudinally extending keyway 33 within which the inner end of a threaded pin 24 extending through the upper part 11 is adapted to engage, in order to hold the gauge pin 19 against rotary movement while permitting limited sliding movement thereof. A spring 25 is disposed in the opening 17 bearing at its upper end against the lower end of the body 21 so as to constantly urge the pin 19 upwardly.

A gauge pin adjusting collar or member 26 is threaded onto the bolt 14 and is formed at its lower end with an annular sleeve or flange 27 adapted to telescope over the outer surface of the upper part 11. The upper part 11 is provided with a plurality of longitudinally spaced apart gauge marks 28 and the lower bevelled edge 29 of the annulus 27 is formed with a plurality of graduations 30 which are correlated with a longitudinal line 31 carried by the upper part 11 to determine the degree of extension of the pin 19 from the lower end of the gauge shank 14. The upper end of the pin adjusting member 26 is formed with an annular flange 32 rotatably engaging about a lower enlargement or nut 33 which is carried by the handle 13 and into which the bolt or screw 14 threadably engages.

In the use and operation of the instrument, the shank 14 is extended into the opening which is to be measured, and the gauging pin 19 initially may be in its retracted position. When the shank 14 is within the opening in the workpiece, the pin projecting member 26 may be rotated on the bolt 14. Rotation of the pin projecting member 26 will force the pin 19 to an extended position with the gauging face or surface 20 projecting laterally of the shank 14. The circumferential gauge marks 28 will determine roughly the size of the hole whereas the longitudinal gauge marks 33 will, in correlation with the gauge marks 30 carried by the adjusting member 26, determine the accurate size of the opening.

What I claim is:

1. A precision instrument comprising a shank for insertion into an opening in a workpiece, said shank having an opening disposed on an angle to the length thereof and opening through one side adjacent one end of said shank, an elongated spring-pressed pin slidable in said latter opening, said pin having the outer end thereof rounded to substantially the curvature of said shank, and an enlarged body carried by the opposite end of said shank, said body having an opening disposed on an angle aligning with opening of said shank and said pin slidably extending into said body opening.

2. A precision instrument comprising a shank for insertion into an opening in a workpiece, an enlarged body carried by one end of said shank, said shank having an opening disposed on an angle to the length thereof and opening through one side adjacent the opposite end of said shank, a pin slidable in said shank opening, said body also having an opening aligning with said shank opening, a head carried by said pin slidable in said body opening and projecting above said body, a threaded member carried by said body and extending thereabove, a pin operator threaded onto said threaded member and engageable with said head, an annular graduated flange carried by said operator, and graduations carried by said body correlated with the graduations of said flange for indicating the diameter of the opening in the workpiece.

3. A precision measuring instrument as set forth in claim 2, including means for holding said pin against rotary movement while permitting endwise movement thereof.

4. A precision measuring instrument as set forth in claim 2 wherein the outer end of said pin is rounded and cut on an angle parallel with the longitudinal axis of said shank.

HANS RUDOLPH.